(12) United States Patent
Irwin et al.

(10) Patent No.: US 7,770,685 B2
(45) Date of Patent: Aug. 10, 2010

(54) PROPULSION SYSTEM FOR A WORK VEHICLE HAVING A SINGLE DRIVE PUMP AND DIFFERENTIAL CAPABILITY

(75) Inventors: Stanley L Irwin, Dubuque, IA (US); Jeffrey A Bauer, Asbury, IA (US); Scott S Hendron, Dubuque, IA (US); Lyndall Tunell, Dubuque, IA (US)

(73) Assignee: Deere & Company, Moline, IL (US)

( * ) Notice: Subject to any disclaimer, the term of this patent is extended or adjusted under 35 U.S.C. 154(b) by 840 days.

(21) Appl. No.: 11/551,513

(22) Filed: Oct. 20, 2006

(65) Prior Publication Data

US 2007/0096551 A1 May 3, 2007

Related U.S. Application Data

(60) Provisional application No. 60/731,957, filed on Oct. 31, 2005.

(51) Int. Cl.
*B60K 7/00* (2006.01)
*B60K 17/14* (2006.01)

(52) U.S. Cl. .................................. 180/308; 180/307
(58) Field of Classification Search ............... 180/305, 180/306, 307, 308
See application file for complete search history.

(56) References Cited

U.S. PATENT DOCUMENTS

| | | | | | |
|---|---|---|---|---|---|
| 2,060,220 A | * | 11/1936 | Kennedy | ..................... | 180/305 |
| 2,949,971 A | * | 8/1960 | Cline | ......................... | 180/6.3 |
| 3,149,464 A | * | 9/1964 | Fauchere | ..................... | 60/426 |
| 3,207,244 A | * | 9/1965 | Becker et al. | .............. | 180/6.48 |
| 3,448,577 A | * | 6/1969 | Crawford | ..................... | 60/420 |
| 3,656,570 A | * | 4/1972 | Gortnar et al. | ............. | 180/6.48 |
| 3,907,053 A | * | 9/1975 | Savage | ....................... | 180/6.48 |
| 4,236,595 A | * | 12/1980 | Beck et al. | ................... | 180/243 |
| 4,502,558 A | * | 3/1985 | Mauri | ........................ | 180/14.3 |
| 4,503,928 A | * | 3/1985 | Mallen-Herrero et al. | ... | 180/308 |
| 4,874,057 A | * | 10/1989 | Smith | ......................... | 180/242 |
| 4,903,792 A | * | 2/1990 | Ze-ying | ...................... | 180/308 |
| 5,715,664 A | | 2/1998 | Sallstrom et al. | | |
| 5,915,496 A | | 6/1999 | Bednar et al. | | |
| 6,135,231 A | * | 10/2000 | Reed | .......................... | 180/308 |
| 6,267,163 B1 | * | 7/2001 | Holmes | ...................... | 144/336 |
| 6,408,972 B1 | * | 6/2002 | Rodgers et al. | ............. | 180/197 |
| 6,732,828 B1 | * | 5/2004 | Abend et al. | ................ | 180/242 |
| 7,383,913 B1 | * | 6/2008 | Tsukamoto et al. | ......... | 180/307 |
| 2004/0195027 A1 | * | 10/2004 | Abend et al. | ................ | 180/242 |
| 2005/0126843 A1 | * | 6/2005 | Irikura | ........................ | 180/305 |
| 2006/0243515 A1 | * | 11/2006 | Okada et al. | ................ | 180/305 |

OTHER PUBLICATIONS

Bucher Hydraulics, QX Internal gear drive units, at least as early as Oct. 20, 2006, 4 pgs.
Bucher Hydraulics, Internal Gear Flow Divider Series QXT, Oct. 2004, 4 pgs.

(Continued)

*Primary Examiner*—Paul N Dickson
*Assistant Examiner*—John R Olszewski
(74) *Attorney, Agent, or Firm*—Baker & Daniels LLP (57) ABSTRACT

A hydraulic drive circuit for a work vehicle including a positive displacement flow divider positioned intermediate a hydraulic pump and a plurality of hydraulic motors.

21 Claims, 4 Drawing Sheets

OTHER PUBLICATIONS

Bucher Hydraulics, QXT— not just a flow divider, Sep. 2003, 4 pgs.
jbj Techniques Limited, Flow Dividers, at least as early as Jun. 12, 2006, 1 pg.
Hydraulics & Pneumatics, Intensification circuit uses rotary flow divider, at least as early as Jun. 12, 2006, Penton Media, Inc., 1 pg.
Hydraulics & Pneumatics, Regulate Flow, Regulate Speed, at least as early as Jun. 12, 2006, Penton Media, Inc., 4 pgs.
Hydraulics & Pneumatics, Flow-control valves—part 2, at least as early as Jun. 12, 2006, Penton Media, Inc., 4 pgs.

Roper Pump Company's Latest Liquid Fuel Flow Divider Designs Guard Against the Most Common Causes of Failure, Nov. 2003, 2 pgs.

* cited by examiner

PROPULSION SYSTEM FOR A WORK VEHICLE HAVING A SINGLE DRIVE PUMP AND DIFFERENTIAL CAPABILITY

CROSS-REFERENCE TO RELATED APPLICATION

This application claims priority to U.S. Provisional Application Ser. No. 60/731,957, filed Oct. 31, 2005, the disclosure of which is expressly incorporated by reference herein.

BACKGROUND AND SUMMARY OF THE INVENTION

The present invention relates generally to a hydraulic drive system and, more particularly, to a hydraulic drive system including a plurality of traction members individually driven by separate hydraulic drive motors.

Many work vehicles use hydraulics to control certain functions. For example, many work vehicles, such as four wheel drive articulated loaders, include hydraulic drive motors operably coupled to each wheel to drive the vehicle in motion. When the vehicle is traveling in a straight line, all four wheels move along the ground at substantially the same contact or ground speed (although the rotational speed of the rear wheels may vary relative to the rotational speed of the front wheels, depending upon their respective radii). However, when the vehicle is turning, the wheels do not move at the same ground speed. For example, when the vehicle is turning to the left, the ground speed of the right front wheel and the right rear wheel is greater than the ground speed of the left front wheel and left rear wheel, respectively, due to the greater distance from the center of the turn. As is known, the outside wheel in a turn must move at a faster ground speed than the corresponding inside wheel.

Additionally, it is known that turning wheels (i.e., those wheels which are turning or steering, whether front or rear) typically move at a faster ground speed than those wheels which are not turning. For example, if the front wheels are turning, then typically the left front wheel and right front wheel move faster than the left rear wheel and right rear wheel, respectively. In general, the left and right turning wheels move fastener than the respective left and right non-turning wheels.

As may be appreciated, to accommodate the increased ground speed of a wheel in a turn, whether an outside wheel or a turning wheel, the hydraulic drive motor associated with the faster moving wheel must likewise move faster. To do this, the hydraulic drive motor associated with the faster wheel requires more hydraulic fluid than the hydraulic drive motor associated with the slower wheel.

In some conventional work vehicles, a single hydraulic pump provides flow proportionally to multiple hydraulic motors connected in parallel. While this arrangement allows the wheels to rotate at relative variable speeds, for example, when turning, it is limited in its ability to deliver propulsion when one or more wheels lose traction. More particularly, the hydraulic fluid takes the path of least resistance in such a situation, such that all fluid flows to the wheel which loses traction, thereby causing propulsion to cease and the work vehicle to stop moving.

A differential lock in the form of a spool type flow divider may be utilized to proportion or divide the flow of hydraulic fluid from the pump to the individual drive motors. However, such spool type flow dividers typically operate efficiently only within a narrow flow range due to limitations of the divider orifices. The spool type flow divider relies on pressure developed from hydraulic flows and thereby becomes less effective at low flow rates. Moreover, the dividing function is substantially reduced, if not effectively lost, in low flow ranges. As such, a spool type flow divider may cause the loss of power to the drive motors when another vehicle function, such as steering, loading, or braking is using hydraulic fluid. Additionally, such spool type flow dividers may generate heat due to fluid flow through the orifices.

According to an illustrative embodiment of the disclosure, a vehicle includes a frame, a first traction member operably coupled to the frame, and a second traction member operably coupled to the frame. A first hydraulic motor is operably coupled to the first traction member for driving the first traction member in motion. A second hydraulic motor is operably coupled to the second traction member for driving the second traction member in motion. A hydraulic pump is fluidly coupled to the first hydraulic motor and the second hydraulic motor. A first positive displacement flow divider is positioned intermediate the hydraulic pump and the first and second hydraulic motors. The first positive displacement flow divider is configured to divide the flow of hydraulic fluid from the hydraulic pump to the first and second hydraulic motors, and to provide a differential lock so that during a first mode of operation the speed of the first hydraulic motor is substantially fixed relative to the speed of the second hydraulic motor.

Further illustratively, the hydraulic pump is a bi-directional pump including a forward port and a reverse port, wherein the forward port is fluidly coupled in series to the first positive displacement flow divider. Further illustratively, a second positive displacement flow divider is fluidly coupled in series to the reverse port of the hydraulic pump. The first positive displacement flow divider is positioned intermediate the hydraulic pump and forward ports of the first hydraulic motor and the second hydraulic motor, and the second positive displacement flow divider is positioned intermediate the hydraulic pump and reverse ports of the first hydraulic motor and the second hydraulic motor.

Further illustratively, a crossover orifice is provided in fluid communication with a fluid path from the first positive displacement flow divider to the first hydraulic motor and a fluid path from the first positive displacement flow divider to the second hydraulic motor. The crossover orifice is configured to provide a bypass so that during a second mode of operation the speed of the first hydraulic motor may vary relative to the speed of the second hydraulic motor.

According to a further illustrative embodiment of the disclosure, a vehicle includes a frame, a first traction member operably coupled to the frame, and a second traction member operably coupled to the frame. A first hydraulic motor is operably coupled to the first traction member and includes a forward port and a reverse port. A second hydraulic motor is operably coupled to the second traction member and includes a forward port and a reverse port. A bi-directional hydraulic pump includes a forward port and a reverse port, wherein the forward port of the pump is fluidly coupled to the forward port of the first hydraulic motor and the forward port of the second hydraulic motor. The reverse port of the pump is fluidly coupled to the reverse port of the first hydraulic motor and the reverse port of the second hydraulic motor. A forward rotary gear flow divider includes an inlet port, a first outlet port, and a second outlet port, wherein the first outlet port is in fluid communication with the inlet port and the forward port of the first hydraulic motor, and the second outlet port is in fluid communication with the inlet port and the forward port of the second hydraulic motor. A reverse rotary gear flow divider includes an inlet port, a first outlet port, and a second outlet port, wherein the first outlet port is in fluid communication with the inlet port and the reverse port of the first hydraulic motor, and the second outlet port is in fluid communication with the inlet port and the reverse port of the second hydraulic motor.

Further illustratively, a crossover orifice is provided in fluid communication between a fluid path between the forward rotary gear flow divider to the first hydraulic motor and a fluid path from the forward rotary gear flow divider to the second hydraulic motor. The crossover orifice is configured to provide a fluid bypass for allowing differential speed between the first hydraulic motor and the second hydraulic motor.

Further illustratively, a third hydraulic motor is connected in parallel to the first hydraulic motor. The third hydraulic motor includes a forward port and a reverse port. Similarly, a fourth hydraulic motor is connected in parallel to the first hydraulic motor. The fourth hydraulic motor includes a forward port and a reverse port.

The forward rotary gear flow divider illustratively further includes a third outlet port, and a fourth outlet port, the third outlet port being in fluid communication with the inlet port and the forward port of the third hydraulic motor, and the fourth outlet port being in fluid communication with the inlet port and the forward port of the fourth hydraulic motor. The reverse rotary gear flow divider illustratively further includes a third outlet port, and a fourth outlet port, the third outlet port being in fluid communication with the inlet port and the reverse port of the third hydraulic motor, and the fourth outlet port being in fluid communication with the inlet port and the reverse port of the fourth hydraulic motor.

According to another illustrative embodiment of the disclosure, a hydraulic circuit includes a bi-directional pump including a forward port and a reverse port, and a forward rotary gear flow divider including an inlet port connected to the forward port of the bi-directional pump. The forward rotary gear flow divider further includes a first outlet port, a second outlet port, a third outlet port, a fourth outlet port, a first gear motor in fluid communication with the first outlet port, a second gear motor in fluid communication with the second outlet port, a third gear motor in fluid communication with the third outlet port, a fourth gear motor in fluid communication with the fourth outlet port, and a shaft operably coupling the first gear motor, the second gear motor, the third gear motor, and the fourth gear motor. A first drive motor includes a forward port and a reverse port, the forward port being connected to the first outlet port of the forward rotary gear flow divider. A second drive motor includes a forward port and a reverse port, wherein the forward port is connected to the second outlet port of the forward rotary gear flow divider. A third drive motor includes a forward port and a reverse port, wherein the forward port is connected to the third outlet port of the forward rotary gear flow divider. A fourth drive motor includes a forward port and a reverse port, wherein the forward port is connected to the fourth outlet port of the forward rotary gear flow divider.

Further illustratively, a first crossover orifice is connected to the first outlet and the second outlet and is configured to provide a bypass for permitting differential speed between the first drive motor and the second drive motor. A second crossover orifice is illustratively connected to the second outlet and the third outlet and is configured to provide a bypass for permitting differential speed between the second drive motor and the third drive motor. A third crossover orifice is illustratively connected to the third outlet and the fourth outlet and is configured to provide a bypass for permitting differential speed between the third drive motor and the fourth drive motor.

BRIEF DESCRIPTION OF THE DRAWINGS

The detailed description of the drawings particularly refers to the accompanying figures in which.

DETAILED DESCRIPTION OF THE DRAWINGS

Figure 1:
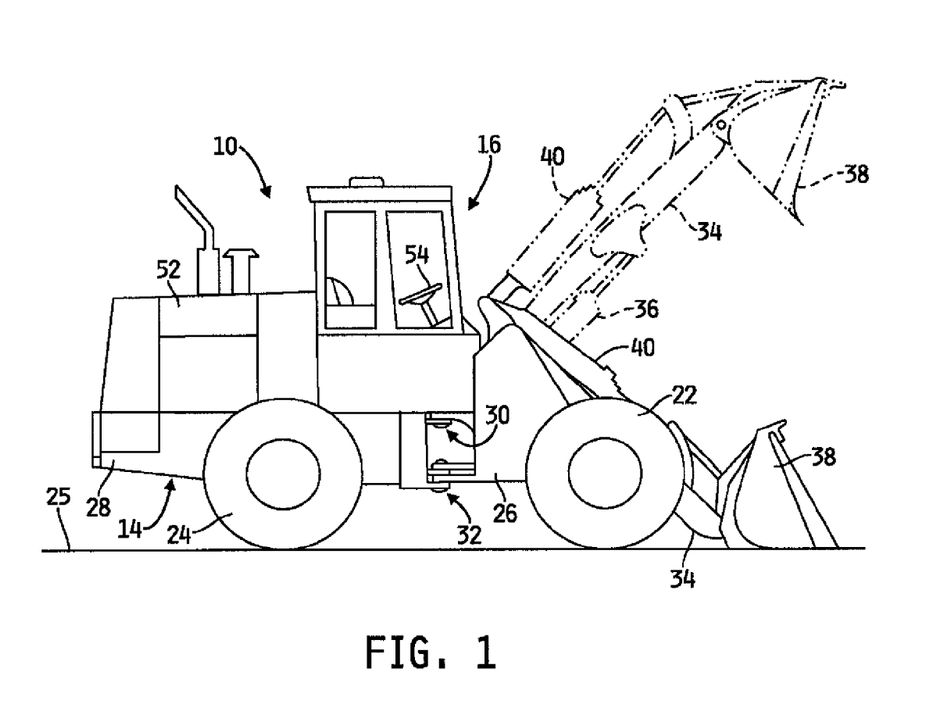
FIG. 1 is a side elevational view of an illustrative vehicle incorporating a hydraulic drive circuit of the disclosure.
Figure 2:
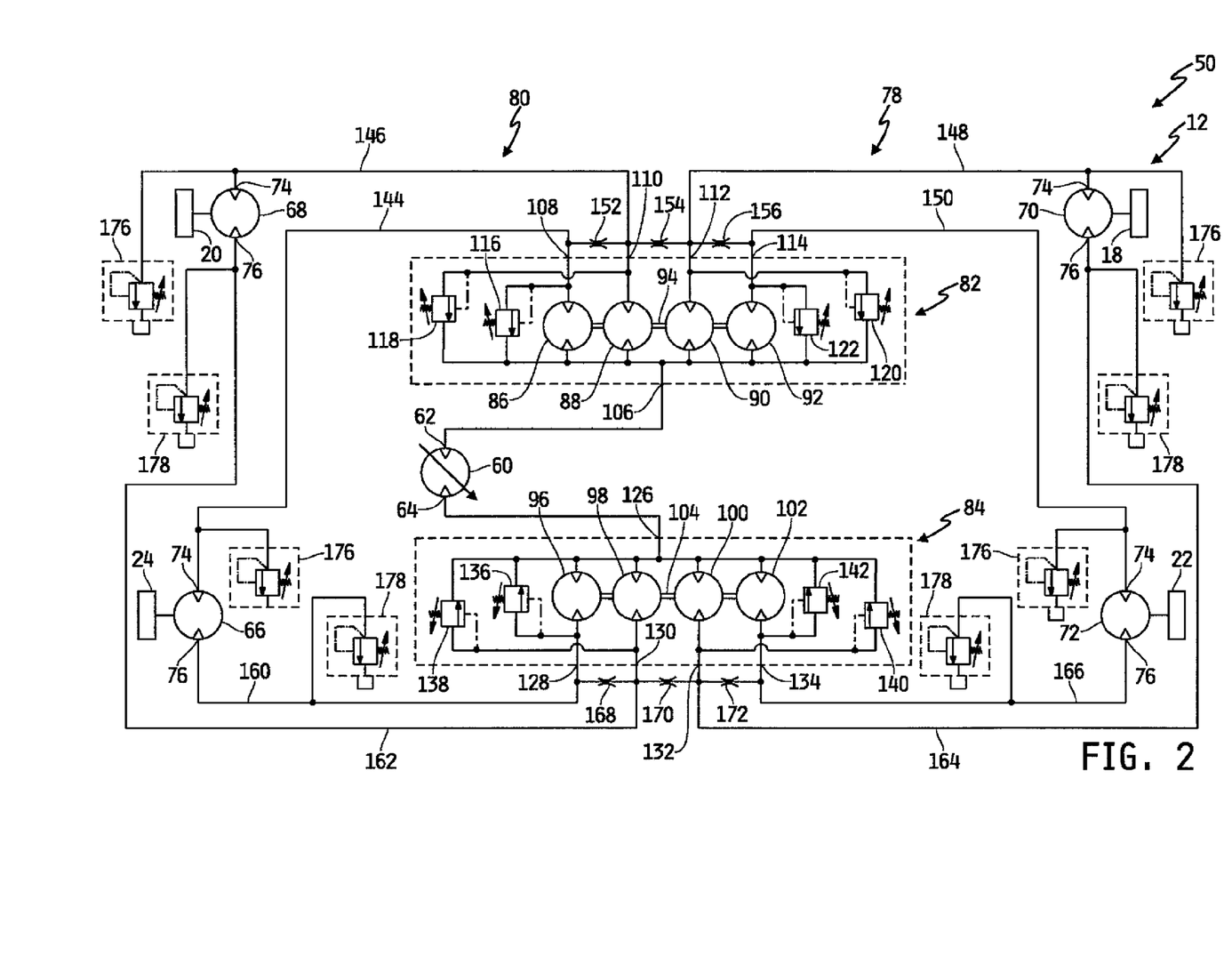
FIG. 2 is a schematic view of an illustrative hydraulic drive circuit of the disclosure, including a four-section forward rotary gear flow divider, configured to divide flow between four drive motors in a forward direction, and a four-section reverse rotary gear flow divider, configured to divide flow between four drive motors in a reverse direction.

Referring initially to FIG. 1, a four-wheel drive vehicle, illustratively an articulated loader 10, incorporating an illustrative embodiment hydraulic drive circuit 12 is shown. While an articulated loader 10 is illustrated, the present invention may find wide applicability on a number of different vehicles. The loader 10 includes an articulated frame 14 supporting a passenger cab 16. A plurality of traction devices, illustratively wheels 18, 20, 22, and 24 support the frame 14 above the ground 25 (FIGS. 1 and 2). More particularly, the wheels 18, 20, 22, and 24 are operably coupled to the frame 14 and are configured to drive the frame 14 in motion along the ground 25. The front wheels 18 and 22 and the rear wheels 20 and 24 may be of the same or different sizes. It should be appreciated that other traction devices, such as endless tracks, may be substituted for the wheels 18, 20, 22, and 24.

The frame 14 illustratively includes a rigid front portion 26 and a rigid rear portion 28 that is pivotally coupled to the front portion 26 through vertical pivots 30 and 32. A boom 34 is pivotally supported by the front portion 26 and is configured to be lifted by boom hydraulic actuators or cylinders 36. A bucket 38 is supported by the boom 34 and is configured to be pivoted by bucket hydraulic actuators or cylinders 40.

The loader 10 includes a hydraulic system 50 having illustrative hydraulic drive circuit 12 (FIG. 2). The loader 10 also includes an engine 52, illustratively an internal combustion engine. The loader 10 may also include a conventional steering system including a steering wheel 54. In the illustrative embodiment, the steering wheel 54 is operably connected to a conventional hydraulic steering circuit (not shown) for turning the front portion 26 of the frame 14 relative to the rear portion 28 of the frame 14 about vertical pivots 30 and 32 for steering the loader 10. In alternative embodiments, the hydraulic steering circuit may turn the front wheels 18 and 22 and/or the rear wheels 20 and 24 to steer the loader 10.

Referring to FIG. 2, the hydraulic drive circuit 12 illustratively includes a bi-directional hydraulic pump 60 having opposite forward and reverse ports 62 and 64. The hydraulic pump 60 may be driven in any conventional manner. In the illustrative embodiment, the pump 60 is driven by the engine 52.

The drive circuit 12 further illustratively includes hydraulic drive motors 66, 68, 70, and 72, each operably coupled to a wheel 18, 20, 22, and 24, respectively. More particularly, the first, or right rear, drive motor 66 is illustratively coupled to right rear wheel 24, while the second, or left rear, drive motor 68 is illustratively coupled to left rear wheel 20. Similarly, the third, or left front, drive motor 70 is illustratively coupled to left front wheel 18, and the fourth, or right front, drive motor 72 is illustratively coupled to right front wheel 22. Each motor 66, 68, 70, and 72 includes opposite forward (A) and reverse (B) ports 74, and 76, respectively. As is known in the art, hydraulic fluid supplied to the forward port 74 of each motor 66, 68, 70, and 72 causes operation thereof in a first or forward direction, while hydraulic fluid supplied to the reverse port 76 of each motor 66, 68, 70, and 72 causes operation thereof in a second or reverse direction.

With further reference to FIG. 2, a first or front hydraulic circuit 78 is connected in parallel to a rear hydraulic circuit 80 through flow dividers 82 and 84. In the illustrative embodiment drive circuit 12, a first or forward positive displacement flow divider 82 is positioned intermediate the hydraulic pump 60 and the front and rear circuits 78 and 80. Similarly, a second or reverse positive displacement flow divider 84 is positioned intermediate the pump 60 and the front and rear circuits 78 and 80. The forward positive displacement flow divider 82 illustratively comprises a four-section rotary gear flow divider including first, second, third and fourth rotary gear motors 86, 88, 90, and 92. The gear motor 86, 88, 90, and 92 are operably coupled to a common shaft 94 to rotate in unison therewith. Similarly, the reverse positive displacement flow divider 84 comprises a four-section rotary gear flow divider including gear motors 96, 98, 100 and 102. The gear motors 96, 98, 100 and 102 are operably coupled to a common shaft 104 to rotate in unison therewith. Since all of the gear motors 86, 88, 90, 92 and 96, 98, 100, 102 of each respective flow divider 82 and 84 rotates at the same speed, the hydraulic fluid is positively displaced proportionately. Positive fluid displacement provides for a substantially consistent relative fluid distribution over a wide range of fluid flows (vehicle speeds). While any positive displacement flow divider may be utilized with the drive circuit 12, illustrative embodiments utilize rotary flow dividers available from Haldex Hydraulics Corporation of Rockford, Ill.

An inlet port 106 of the forward flow divider 82 is operably coupled to the forward port 62 of pump 60. Fluid from the inlet port 106 is divided through the gear motors 86, 88, 90, and 92 and supplied to outlet ports 108, 110, 112, and 114. Pressure relief valves 116, 118, 120, and 122 are connected in parallel to each of the gear motors 86, 88, 90 and 92, respectively, in order to prevent unintended pressure intensification. Moreover, the relief valves 116, 118, 120, and 122 are configured to prevent a pressure drop at any one of the outlet ports 108, 110, 112, and 114 from causing a full differential pressure to be applied across that particular branch. In such an instance, the pressurized branch could act as a hydraulic motor and drive the remaining gear motors as pumps. A higher or intensified pressure in the remaining circuit branches may result, and is sought to be avoided by the relief valves 116, 118, 120, and 122.

The reverse flow divider 84 includes an inlet port 126 which is fluidly coupled with the reverse port 64 of pump 60. The reverse flow divider 84 is substantially the same as the forward flow divider 82. As such, the reverse flow divider 84 includes outlet ports 128, 130, 132, and 134 which are all fluidly coupled to the inlet port 126 through the respective gear motors 96, 98, 100 and 102. Also similar to the forward flow divider 82, the reverse flow divider 84 includes pressure relief valves 136, 138, 140, and 142 which are connected in parallel with respective gear motors 96, 98, 100 and 102.

As clearly shown in FIG. 2, the first and second outlet ports 108 and 110 of the forward flow divider 82 are fluidly coupled to the first and second drive motors 66 and 68 through fluid lines 144 and 146, respectively. Similarly, the third and fourth outlet ports 112 and 114 of the forward flow divider 82 are fluidly coupled to the third and fourth drive motors 70 and 72 through fluid lines 148 and 150, respectively. A first crossover orifice 152 is positioned between fluid line 144 and fluid line 146. A second crossover orifice 154 is positioned between fluid line 146 and fluid line 148. Similarly, a third crossover orifice 156 is positioned between fluid line 148 and fluid line 150. The first crossover orifice 152 provides for a limited amount of hydraulic fluid to bypass between fluid lines 144 and 146, for example, when the speed of the respective drive motors 66 and 68 varies, for example due to vehicle turning, or uneven tractive planes or wheel contact. The third crossover orifice 156 provides for a similar functionality between the fluid lines 148 and 150 and hence, respective drive motors 70 and 72. Second crossover orifice 154 provides for a bypass between the front and rear circuits 78 and 80, through respective fluid lines 148 and 146. While the crossover orifices 152, 154, and 156 are shown external to the flow divider 82, it should be appreciated that they may be integral therewith.

As with the forward flow divider 82, the outlet ports 128 and 130 of the reverse flow divider 84 are fluidly coupled to the reverse ports 76 of first and second motors 66 and 68 through fluid lines 160 and 162, respectively. Similarly, the third and fourth outlet ports 132 and 134 are fluidly coupled to the third and fourth motors 70 and 72 through fluid lines 164 and 166, respectively. First, second and third crossover orifices 168, 170 and 172 provide bypasses between the respective fluid lines 160, 162, 164 and 166. More particularly, these orifices 168, 170, and 172 provide bypasses to facilitate the flow of hydraulic fluid in the event of speed variations between the respective motors 66, 68, 70, and 72 in the manner detailed above with respect to the crossover orifices 152, 154, and 156. Again, the crossover orifices 152, 154, and 156 may be internal or external to the flow divider 84.

Forward pressure relief valves 176 and reverse pressure relief valves 178 are associated with each motor 66, 68, 70, and 72. The pressure relief valves 176 and 178 are provided to limit the maximum individual motor differential pressure applied to the respective forward and reverse ports 74 and 76.

In first or straight drive modes of operation, hydraulic fluid flows from pump 60 through either forward port 62 (for forward operation) or reverse port 64 (for reverse operation). Assuming forward operation, the hydraulic fluid is positively displaced and divided, or proportioned, by the respective gear motors 86, 88, 90, and 92 of forward flow divider 82. The hydraulic fluid is then transferred to the drive motors 66, 68, 70, and 72 through fluid lines 144, 146, 148, and 150, respectively. The forward flow divider 82 provides a forward differential lock substantially fixing relative fluid flow between the drive motors 66, 68, 70, and 72 in a forward direction.

Crossover orifices 152, 154 and 156 are utilized in second modes of operation, for example when steering the vehicle 10. For instance, should the speed of one drive motor, for example drive motor 66, vary relative to the other motors, for example motors 68, 70, and 72, then a respective crossover orifice, here crossover orifice 152, will permit limited hydraulic fluid flow therethrough. More particularly, fluid crossover orifice 152 permits right rear drive motor 66 to operate at a different speed from left rear drive motor 68. Similarly, crossover orifice 156 permits left front drive motor 70 to operate at a different speed from right front drive motor 72. Crossover orifice 154 permits rear drive motors 66 and 68 to operate at different speeds from front drive motors 70 and 72.

Operation in a reverse direction is substantially similar to that detailed above in a forward direction. However, hydraulic fluid flows from reverse port 64 of the pump 60 and into inlet port 126 of the reverse flow divider 84. The reverse flow divider 84 provides a reverse differential lock substantially fixing relative fluid flow between drive motors 66, 68, 70, and 72 in a reverse direction.

Figure 3:
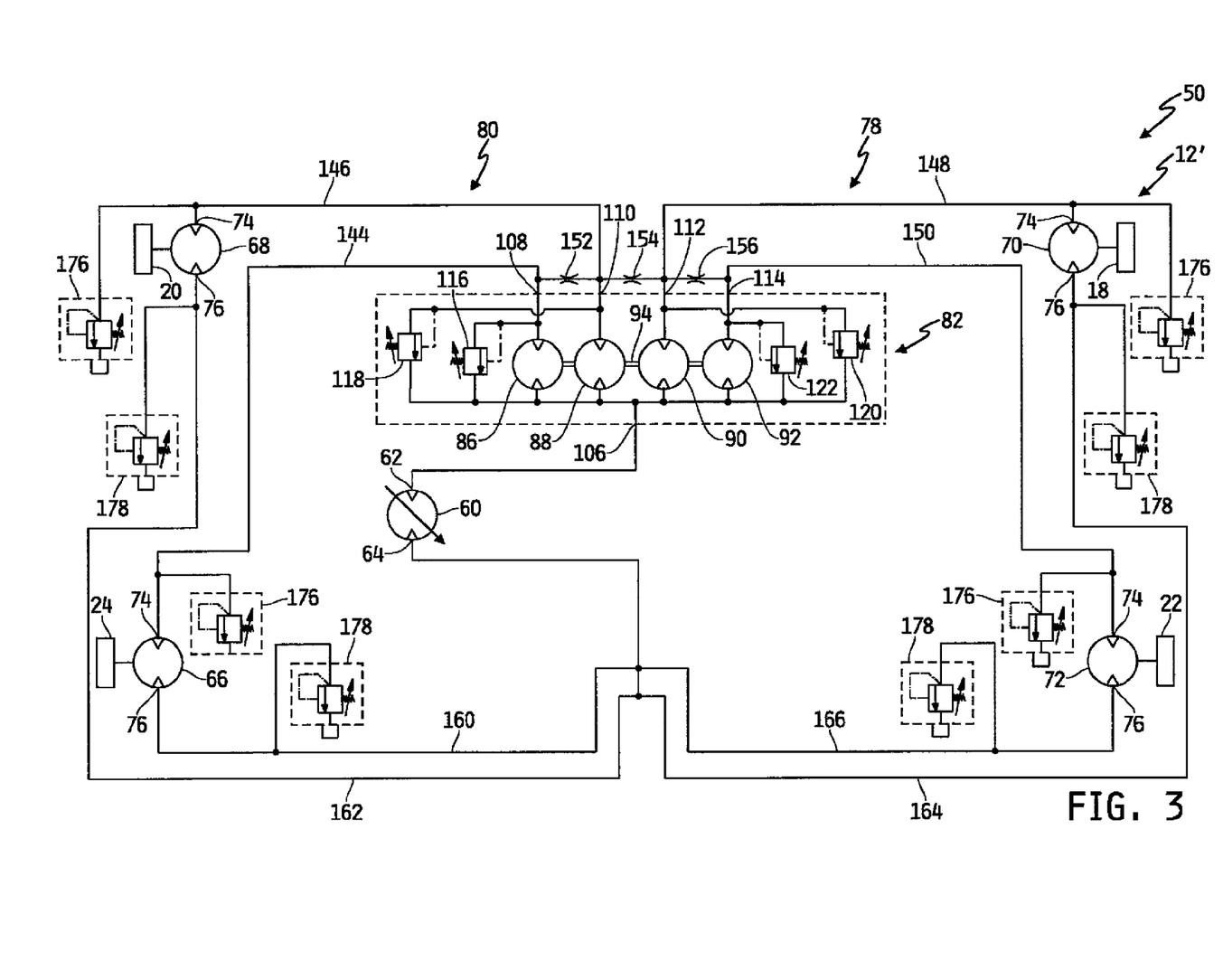
FIG. 3 is a schematic view of another illustrative embodiment hydraulic drive circuit, including a four-section forward rotary gear flow divider, configured to divide flow between four drive motors in a forward direction.

Referring now to FIG. 3, a further illustrative embodiment drive circuit 12' is shown. The drive circuit 12' is substantially similar to that shown in FIG. 2, except for the removal of the reverse flow divider 84. Instead, the reverse port 64 of the pump 60 is directly connected to the reverse port 76 of the respective motors 66, 68, 70, and 72. As such, this hydraulic circuit 12' provides for the positively displaced fluid flow division in a forward direction, while providing for passive fluid flow division in a reverse direction. In other words, drive circuit 12' provides a forward differential lock, but not a reverse differential lock. It should be appreciated that in an alternative embodiment, the forward flow divider 82 could be removed instead of the reverse flow divider 84. In such an embodiment, the drive circuit would provide a reverse differential lock, but not a forward differential lock.

Figure 4:
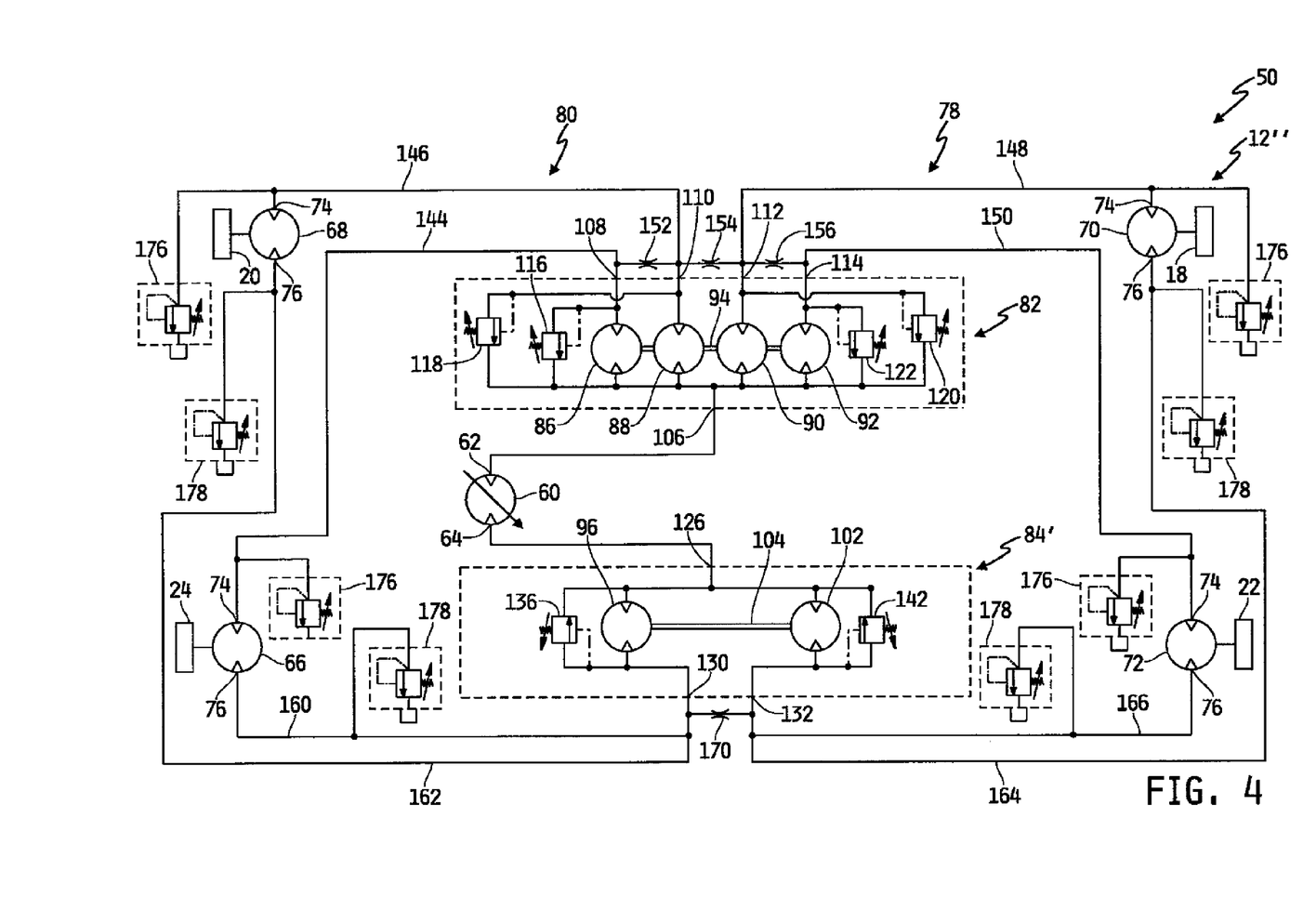
FIG. 4 is a schematic view of a further illustrative hydraulic drive circuit, including a four-section forward rotary gear flow divider, configured to divide flow between four drive motors in a forward direction, and a two-section reverse rotary gear flow divider, configured to divide flow between a pair of front drive motors and a pair of rear drive motors in a reverse direction.

FIG. 4 is a further illustrative embodiment hydraulic drive circuit 12". Again, in a forward direction, the drive circuit 12" is substantially similar to the drive circuit 12 of FIG. 2. However, the reverse flow divider 84' includes only gear motors 96 and 102. As such, the reverse flow divider 84' provides for positively displaced fluid flow division between the front and rear circuits 78 and 80 in a reverse direction. However, the reverse flow divider 84' provides for only passive fluid flow division between the motors 66 and 68 of the rear circuit 80, and between the motors 70 and 72 of the front circuit 78. In other words, drive circuit 12" provides a full forward differential lock, and a limited reverse differential lock. It should be appreciated that in an alternative embodiment, the reverse flow divider 84 may include four gear motors 96, 98, 100, and 102, while the forward flow divider 82' may include only two gear motors 86 and 92. In such an embodiment, the drive circuit would provide a full reverse differential lock, and a limited forward differential lock.

Although the invention has been described in detail with reference to certain preferred embodiments, variations and modifications exist within the spirit and scope of the invention as described and defined in the following claims.

The invention claimed is:

1. A vehicle comprising:
a frame having a front end and a rear end;
a first traction member operably coupled to the front end of the frame;
a second traction member operably coupled to the rear end of the frame;
a first hydraulic motor operably coupled to the first traction member for driving the first traction member in motion;
a second hydraulic motor operably coupled to the second traction member for driving the second traction member in motion;
a hydraulic pump fluidly coupled to the first hydraulic motor and the second hydraulic motor;
a first positive displacement flow divider positioned intermediate the hydraulic pump and the first and second hydraulic motors, the first positive displacement flow divider being configured to divide the flow of hydraulic fluid from the hydraulic pump to the first and second hydraulic motors and to provide a differential lock so that during a first mode of operation the speed of the first hydraulic motor is substantially fixed relative to the speed of the second hydraulic motor; and
a crossover orifice in fluid communication with a fluid path from the first positive displacement flow divider to the first hydraulic motor and a fluid path from the first positive displacement flow divider to the second hydraulic motor, the crossover orifice configured to provide a bypass so that during a second mode of operation the speed of the first hydraulic motor may vary relative to the speed of the second hydraulic motor.

2. The vehicle of claim 1, wherein the frame is articulated and includes a front portion and a rear portion pivotally coupled to the front portion.

3. The vehicle of claim 1, wherein the first traction member comprises one of a wheel and a track, and the second traction member comprises one of a wheel and a track.

4. The vehicle of claim 1, wherein the hydraulic pump is a bi-directional pump including a forward port and a reverse port, the forward port being fluidly coupled in series to the first positive displacement flow divider.

5. The vehicle of claim 1, wherein the first positive displacement flow divider includes a plurality of gear motors and a common shaft operably coupling the plurality of gear motors.

6. The vehicle of claim 1, further comprising at least one pressure relief valve associated with each of the first and second motors, the pressure relief valves configured to limit the maximum pressure applied to each motor as supplied by the first positive displacement flow divider.

7. A vehicle comprising:
a frame;
a first traction member operably coupled to the frame;
a second traction member operably coupled to the frame;
a first hydraulic motor operably coupled to the first traction member for driving the first traction member in motion;
a second hydraulic motor operably coupled to the second traction member for driving the second traction member in motion;
a hydraulic pump fluidly coupled to the first hydraulic motor and the second hydraulic motor wherein the hydraulic pump is a bi-directional pump including a forward port and a reverse port;
a first positive displacement flow divider positioned intermediate the hydraulic pump and the first and second hydraulic motors, the first positive displacement flow divider being configured to divide the flow of hydraulic fluid from the hydraulic pump to the first and second hydraulic motors and to provide a differential lock so that during a first mode of operation the speed of the first hydraulic motor is substantially fixed relative to the speed of the second hydraulic motor; the forward port of the hydraulic pump is fluidly coupled in series to the first positive displacement flow divider; and
a second positive displacement flow divider, the first hydraulic motor and the second hydraulic motor each having a forward port and a reverse port, the reverse port of the hydraulic pump being fluidly coupled in series to the second positive displacement flow divider, the first positive displacement flow divider being positioned intermediate the hydraulic pump and the forward ports of the first hydraulic motor and the second hydraulic motor, and the second positive displacement flow divider being positioned intermediate the hydraulic pump and the reverse ports of the first hydraulic motor and the second hydraulic motor.

8. A vehicle comprising:
a frame;
a first traction member operably coupled to the frame;
a second traction member operably coupled to the frame;
a first hydraulic motor operably coupled to the first traction member for driving the first traction member in motion;
a second hydraulic motor operably coupled to the second traction member for driving the second traction member in motion;
a hydraulic pump fluidly coupled to the first hydraulic motor and the second hydraulic motor; and
a first positive displacement flow divider positioned intermediate the hydraulic pump and the first and second hydraulic motors, the first positive displacement flow divider being configured to divide the flow of hydraulic fluid from the hydraulic pump to the first and second hydraulic motors and to provide a differential lock so that during a first mode of operation the speed of the first hydraulic motor is substantially fixed relative to the speed of the second hydraulic motor;
wherein the first positive displacement flow divider includes a plurality of gear motors and a common shaft operably coupling the plurality of gear motors and a pressure relief valve in parallel with each gear motor.

9. The vehicle of claim 8, further comprising a crossover orifice in fluid communication with a fluid path from the first positive displacement flow divider to the first hydraulic motor and a fluid path from the first positive displacement flow divider to the second hydraulic motor, the crossover orifice configured to provide a bypass so that during a second mode of operation the speed of the first hydraulic motor may vary relative to the speed of the second hydraulic motor.

10. A vehicle comprising:
a frame;
a first traction member operably coupled to the frame;
a second traction member operably coupled to the frame;
a first hydraulic motor operably coupled to the first traction member, the first hydraulic motor including a forward port and a reverse port;
a second hydraulic motor operably coupled to the second traction member, the second hydraulic motor including a forward port and a reverse port;
a bi-directional hydraulic pump including a forward port and a reverse port, the forward port of the pump being fluidly coupled to the forward port of the first hydraulic motor and the forward port of the second hydraulic motor, and the reverse port of the pump being fluidly coupled to the reverse port of the first hydraulic motor and the reverse port of the second hydraulic motor;
a forward rotary gear flow divider including an inlet port, a first outlet port, and a second outlet port, the first outlet port being in fluid communication with the inlet port and the forward port of the first hydraulic motor, and the second outlet port being in fluid communication with the inlet port and the forward port of the second hydraulic motor; and
a reverse rotary gear flow divider including an inlet port, a first outlet port, and a second outlet port, the first outlet port being in fluid communication with the inlet port and the reverse port of the first hydraulic motor, and the second outlet port being in fluid communication with the inlet port and the reverse port of the second hydraulic motor.

11. The vehicle of claim 10, wherein the frame is articulated and includes a front portion and a rear portion pivotally coupled to the front portion.

12. The vehicle of claim 10, wherein the first traction member comprises one of a wheel and a track, and the second fraction member comprises one of a wheel and a track.

13. The vehicle of claim 10, wherein each of the forward rotary gear flow divider and the reverse rotary gear flow divider each includes a plurality of gear motors and a common shaft operably coupling the plurality of gear motors.

14. The vehicle of claim 10, further comprising a crossover orifice providing fluid communication between a fluid path from the forward rotary gear flow divider to the first hydraulic motor and a fluid path from the forward rotary gear flow divider to the second hydraulic motor, the crossover orifice configured to provide a fluid bypass for allowing differential speed between the first hydraulic motor and the second hydraulic motor.

15. The vehicle of claim 10, further comprising at least one pressure relief valve associated with each of the first and second hydraulic motors, the pressure relief valves configured to limit the maximum pressure applied to each of the first and second hydraulic motors by the forward rotary gear flow divider.

16. The vehicle of claim 10, further comprising:
a third hydraulic motor connected in parallel to the first hydraulic motor, the third hydraulic motor including a forward port and a reverse port;
a fourth hydraulic motor connected in parallel to the first hydraulic motor, the fourth hydraulic motor including a forward port and a reverse port;
the forward rotary gear flow divider further including a third outlet port, and a fourth outlet port, the third outlet port being in fluid communication with the inlet port and the forward port of the third hydraulic motor, and the fourth outlet port being in fluid communication with the inlet port and the forward port of the fourth hydraulic motor; and
the reverse rotary gear flow divider further including a third outlet port, and a fourth outlet port, the third outlet port being in fluid communication with the inlet port and the reverse port of the third hydraulic motor, and the fourth outlet port being in fluid communication with the inlet port and the reverse port of the fourth hydraulic motor.

17. A hydraulic circuit comprising:
a bi-directional pump including a forward port and a reverse port;
a forward rotary gear flow divider including an inlet port connected to the forward port of the bi-directional pump, a first outlet port, a second outlet port, a third outlet port, a fourth outlet port, a first gear motor in fluid communication with the first outlet port, a second gear motor in fluid communication with the second outlet port, a third gear motor in fluid communication with the third outlet port, a fourth gear motor in fluid communication with the fourth outlet port, and a shaft operably coupling the first gear motor, the second gear motor, the third gear motor, and the fourth gear motor;
a first drive motor including a forward port and a reverse port, the forward port being connected to the first outlet port of the forward rotary gear flow divider and to at least two of the second, third, and fourth outlet ports of the forward rotary gear flow divider;
a second drive motor including a forward port and a reverse port, the forward port being connected to the second outlet port of the forward rotary gear flow divider;

a third drive motor including a forward port and a reverse port, the forward port being connected to the third outlet port of the forward rotary gear flow divider; and a fourth drive motor including a forward port and a reverse port, the forward port being connected to the fourth outlet port of the forward rotary gear flow divider.

18. The hydraulic circuit of claim 17, further comprising:

a first traction device operably coupled to the first drive motor;

a second traction device operably coupled to the second drive motor;

a third fraction device operably coupled to the third drive motor;

a fourth traction device operably coupled to the fourth drive motor; and a vehicle frame supported by the first traction device, the second traction device, the third traction device, and the fourth traction device.

19. The hydraulic circuit of claim 17, further comprising at least one pressure relief valves associated with each of the first, second, third, and fourth drive motors, the pressure relief valves configured to limit the maximum pressure applied to each drive motor as supplied by the forward rotary gear flow divider.

20. A hydraulic circuit comprising:

a bi-directional pump including a forward port and a reverse port;

a forward rotary gear flow divider including an inlet port connected to the forward port of the bi-directional pump, a first outlet port, a second outlet port, a third outlet port, a fourth outlet port, a first gear motor in fluid communication with the first outlet port, a second gear motor in fluid communication with the second outlet port, a third gear motor in fluid communication with the third outlet port, a fourth gear motor in fluid communication with the fourth outlet port, and a shaft operably coupling the first gear motor, the second gear motor, the third gear motor, and the fourth gear motor;

a first drive motor including a forward port and a reverse port, the forward port being connected to the first outlet port of the forward rotary gear flow divider;

a second drive motor including a forward port and a reverse port, the forward port being connected to the second outlet port of the forward rotary gear flow divider;

a third drive motor including a forward port and a reverse port, the forward port being connected to the third outlet port of the forward rotary gear flow divider;

a fourth drive motor including a forward port and a reverse port, the forward port being connected to the fourth outlet port of the forward rotary gear flow divider;

a first crossover orifice connected to the first outlet and the second outlet and configured to provide a bypass for permitting differential speed between the first drive motor and the second drive motor;

a second crossover orifice connected to the second outlet and the third outlet and configured to provide a bypass for permitting differential speed between the second drive motor and the third drive motor; and a third crossover orifice connected to the third outlet and the fourth outlet and configured to provide a bypass for permitting differential speed between the third drive motor and the fourth drive motor.

21. A hydraulic circuit comprising:

a bi-directional pump including a forward port and a reverse port;

a forward rotary gear flow divider including an inlet port connected to the forward port of the bi-directional pump, a first outlet port, a second outlet port, a third outlet port, a fourth outlet port, a first gear motor in fluid communication with the first outlet port, a second gear motor in fluid communication with the second outlet port, a third gear motor in fluid communication with the third outlet port, a fourth gear motor in fluid communication with the fourth outlet port, and a shaft operably coupling the first gear motor, the second gear motor, the third gear motor, and the fourth gear motor;

a first drive motor including a forward port and a reverse port, the forward port being connected to the first outlet port of the forward rotary gear flow divider;

a second drive motor including a forward port and a reverse port, the forward port being connected to the second outlet port of the forward rotary gear flow divider;

a third drive motor including a forward port and a reverse port, the forward port being connected to the third outlet port of the forward rotary gear flow divider;

a fourth drive motor including a forward port and a reverse port, the forward port being connected to the fourth outlet port of the forward rotary gear flow divider; and a reverse rotary gear flow divider including an inlet port connected to the reverse port of the bi-directional pump, a first outlet port in fluid communication with the reverse port of the first drive motor, a second outlet port in fluid communication with the reverse port of the second drive motor, a third outlet port in fluid communication with the reverse port of the third drive motor, a fourth outlet port in fluid communication with the reverse port of the fourth drive motor, a first gear motor in fluid communication with the first outlet port, a second gear motor in fluid communication with the second outlet port, a third gear motor in fluid communication with the third outlet port, a fourth gear motor in fluid communication with the fourth outlet port, and a shaft operably coupling the first gear motor, the second gear motor, the third gear motor.

* * * * *